US012584454B2

(12) United States Patent
Fang

(10) Patent No.: US 12,584,454 B2
(45) Date of Patent: Mar. 24, 2026

(54) SINGLE CYLINDER INTERNALLY HEATED STIRLING ENGINE

(71) Applicant: Shufeng Fang, Tianjin (CN)

(72) Inventor: Shufeng Fang, Tianjin (CN)

( * ) Notice: Subject to any disclaimer, the term of this patent is extended or adjusted under 35 U.S.C. 154(b) by 0 days.

(21) Appl. No.: 19/008,456

(22) Filed: Jan. 2, 2025

(65) Prior Publication Data

US 2025/0277474 A1 Sep. 4, 2025

Related U.S. Application Data

(63) Continuation of application No. PCT/CN2024/130862, filed on Nov. 8, 2024.

(30) Foreign Application Priority Data

Mar. 4, 2024 (CN) ........................ 202410242995.6

(51) Int. Cl.
*F02G 1/043* (2006.01)
*F02G 1/045* (2006.01)

(52) U.S. Cl.
CPC .......... *F02G 1/0435* (2013.01); *F02G 1/045* (2013.01)

(58) Field of Classification Search
CPC .............................. F02G 1/0435; F02G 1/045
See application file for complete search history.

(56) References Cited

U.S. PATENT DOCUMENTS

2024/0333096 A1 * 10/2024 Whittaker .............. F02G 1/043

FOREIGN PATENT DOCUMENTS

CN 101012785 A 8/2007
CN 101705846 A 5/2010
CN 101709678 A 5/2010
CN 102071980 A * 5/2011
CN 107269479 A 10/2017
CN 117869104 A 4/2024
CN 114688755 B * 9/2024 ............ F02G 1/043
JP 200460489 A * 2/2004 ............ F02G 1/043
JP 2004060489 A * 2/2004 ............ F02G 1/043
WO 2016003182 A2 1/2016

OTHER PUBLICATIONS

English Translation JP-2004060489-A (Year: 2004).*
English Translation CN-102071980-A (Year: 2011).*
English Translation JP 200460489 A (Year: 2004).*
English Translation CN 114688755 B (Year: 2024).*
International Search Report issued in PCT/CN2024/130862, mailed Jan. 26, 2025, with machine translation.

* cited by examiner

*Primary Examiner* — Shafiq Mian
(74) *Attorney, Agent, or Firm* — HSML P.C.

(57) ABSTRACT

The present application relates to a single cylinder internally heated Stirling engine, comprising: a cylinder assembly comprising a hot side cylinder and a cold side cylinder, which are joined together to form a closed single cylinder, and a heat insulation ring is provided between them; a first heat exchanger arranged inside the hot side cylinder and in fluid communication with an external heat source, used to heat the working gas in the hot side cylinder; a second heat exchanger arranged inside the cold side cylinder and in fluid communication with an external cold source, used to cool the working gas in the cold side cylinder; a piston, installed in the cylinder assembly and provided with a gas-flow channel and a gas valve; and a piston rod, one end fixed to the piston and the other end connected to a transmission mechanism located outside the cylinder.

11 Claims, 2 Drawing Sheets

SINGLE CYLINDER INTERNALLY HEATED STIRLING ENGINE

CROSS APPLICATION

This application claims priority to the Chinese invention patent application Ser. No. 20241042995.6, titled "A new single cylinder type Stirling engine" filed on Mar. 4, 2024, the entire contents of which are incorporated herein by reference.

TECHNICAL FIELD

The present invention relates to the field of engines, and specifically to a single cylinder internally heated Stirling engine.

BACKGROUND TECHNOLOGY

The working principle of the Stirling engine is as follows: The two cylinder piston system comprises a hot side cylinder and a cold side cylinder, and the working gas in the two cylinders is connected through channels of a regenerator. The gas medium in the cold side cylinder is compressed under the driving of the flywheel, and the heat of gas in the cold side cylinder is dissipated through the cylinder wall, shrinks in volume, and enters the hot side cylinder through the regenerator. The hot side cylinder expands under the heating of an external heat source, applies external work, and drives the piston of the hot side cylinder to move. The movement of the piston drives the crankshaft of the connecting rod to rotate, and outputs power to the outside. After the piston of the hot side cylinder reaches the dead centre, it moves back under the drive of the flywheel, and compresses and delivers the gas medium in the cylinder to the cold side cylinder. The gas medium loses heat in the cold side cylinder, shrinks in volume, and the piston moves back, then the gas medium is pressurized into the hot side cylinder through the regenerator for circulation.

Due to the material and strength design of the cylinder, the thermal conductivity coefficient of the cylinder is low, resulting in slow heat conduction of external heating and low power of the engine. The structure of its cylinder crankcase makes it difficult to install and arrange in the workplace.

SUMMARY OF THE INVENTION

The purpose of the present invention is to provide a single cylinder internally heated Stirling engine to solve the above-mentioned problems. Therefore, the technical solution of the present invention is as follows:

A single cylinder internally heated Stirling engine, which may comprises:

- a cylinder assembly, comprising a hot side cylinder and a cold side cylinder, wherein the hot side cylinder and the cold side cylinder are joined together to form a single closed cylinder, and a heat insulation ring is provided between the hot side cylinder and the cold side cylinder;
- a first heat exchanger, which is arranged inside the hot side cylinder and is in fluid communication with an external heat source, and used for heating the working gas in the hot side cylinder;
- a second heat exchanger, which is arranged inside the cold side cylinder and is in fluid communication with an external cold source, and used for cooling the working gas in the cold side cylinder;
- a piston, which is a single piston, the piston is arranged inside the cylinder assembly and is capable of reciprocating linearly inside the cylinder assembly, wherein the piston is provided with a gas-flow channel and a gas valve, the gas-flow channel is used for the working gas to transfer between the hot side cylinder and the cold side cylinder, and the gas valve is used to control the on/off of the gas-flow channel; and
- a piston rod, one end of which is connected to the piston and the other end is connected to a transmission mechanism located outside the cylinder assembly.

In one embodiment, the gas valve comprises a valve disc and a valve drive mechanism, wherein the valve disc is provided with a through hole, and the piston is provided with an axial vent hole as the gas-flow channel; the valve disc and the valve drive mechanism are installed in the piston; the valve drive mechanism is used to drive the valve disc to rotate, so that the through hole of the valve disc and the axial vent hole of the piston are aligned or offset, that is, to achieve the opening or closing of the gas valve.

In one embodiment, the valve drive mechanism comprises a control rack, a control gear, and a pneumatic device, the control gear and the valve disc are coaxially and fixedly mounted on a shaft sleeve, which is rotatably mounted on the piston rod; the pneumatic device is mounted on the piston and connected to the control rack; the control rack engages with the control gear to drive the control gear to rotate.

In one embodiment, the axial vent holes comprises two radially symmetrical circular through holes.

In one embodiment, the external heat source comprises a heating equipment and a first circulation pump, the first heat exchanger, the first circulation pump, and the heating equipment are connected through corresponding pipelines to form a hot medium circulation.

In one embodiment, the external cold source comprises a refrigeration equipment and a second circulation pump, the second heat exchanger, the second circulation pump, and the refrigeration equipment are connected through corresponding pipelines to form a cold medium circulation.

In one embodiment, one end of the cylinder assembly is provided with a through hole through which the piston rod passes, and the through hole fits with the piston rod to seal the high-pressure working gas in the cylinder assembly.

In one embodiment, the through hole is provided at the end of the cold side cylinder.

In one embodiment, the transmission mechanism comprises a transmission gear and a transmission rack, wherein the transmission rack is fixedly connected to the piston rod, and the transmission gear engages with the transmission rack.

The beneficial effects of the present invention are as follow:

The present invention provides a new design of a cylinder where the cold side heat exchanger and the hot side heat exchanger act as a heat source and a cold source respectively, which are placed inside the cylinder to directly heat and cool the working gas in the cylinder. Compared to the α type Stirling engine where the external heat source directly heats the cylinder, due to a higher structural strength, the thermal conductivity is low, affecting the engine's thermal power; compared to the β type Stirling engine where external heat sources heat pipelines directly connected to the cylinder, due to the low strength of high thermal conductivity metal materials such as pipelines at high temperatures, they become a weakness in the strength of the cylinder, limiting the maximum pressure of the gas working medium inside the cylinder. In this design, the hot side heat exchanger and the cold side heat exchanger can withstand extremely high external working gas pressure, and the cylinder structure is simple, the thermal power is higher, and the pressure resistance of the cylinder structure is better.

Due to the fact that both the hot media and the cold media are transported to the inside of the cylinder through pipelines, the layout of the engine can be far away from the heat and cold sources, greatly facilitating equipment installation and use, and greatly expanding the application scenarios of this design.

The crankshaft—connecting rod—flywheel mechanism of the traditional Stirling engine is replaced by the single piston—transmission shaft—rack and gear mechanism, effectively simplifying the engine structure, reducing mechanical losses, improving mechanical efficiency, and greatly reducing installation space and equipment weight.

Figure 1:
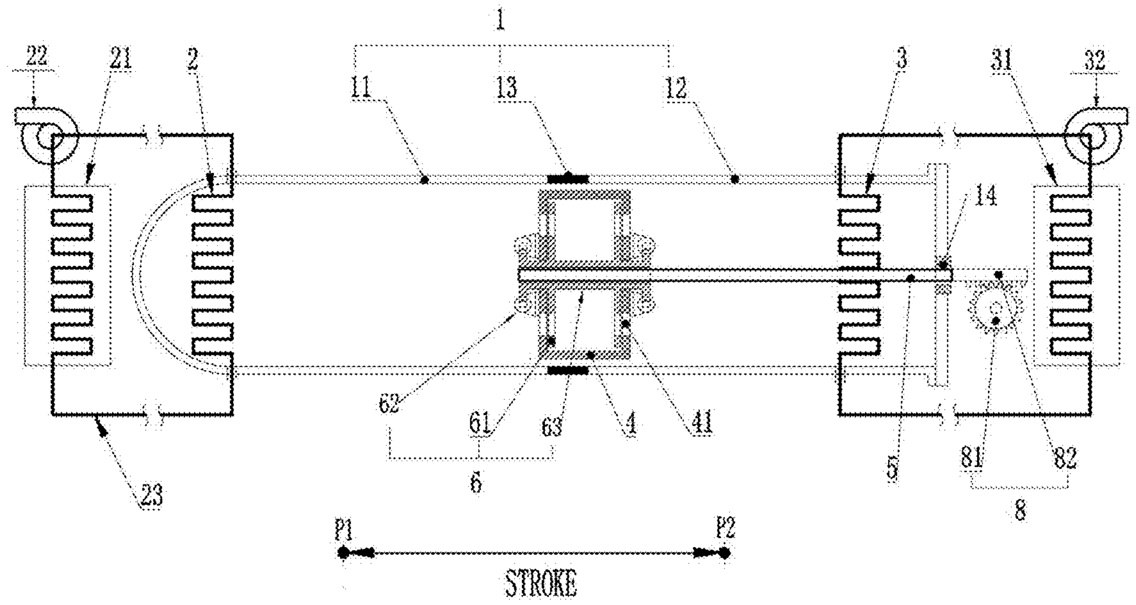
FIG. 1 is a schematic diagram of a single cylinder internally heated Stirling engine according to an embodiment of the present invention.

Reference symbols: 1—cylinder assembly; 11—hot side cylinder; 12—cold side cylinder; 13—insulation ring; 14—through hole; 2—first heat exchanger; 21—heating equipment; 22—first circulation pump; 23—pipeline; 3—second heat exchanger; 31—refrigeration equipment; 32—Second circulation pump; 4—piston; 41—axial vent hole; 6—gas valve; 61—valve disc; 611—through hole; 62—valve drive mechanism; 620—pneumatic device; 623—gas reservoir; 624—pressure control valve; 625—actuator cylinder; 626—one-way intake valve; 621—controlling rack; 622—control gear; 63—shaft sleeve; 5—piston rod; 81—transmission gear; 82—transmission rack; P1—hot dead point; P2—cold dead point.

DETAILED DESCRIPTION OF PREFERRED EMBODIMENTS

Each embodiment of the present application will be described in detail hereinafter in conjunction with the accompanying drawings for a clearer understanding of the purposes, features and advantages of the present application. It should be understood that the embodiments shown in the accompanying drawings are not intended to be a limitation of the scope of the present application, but are merely intended to illustrate the substantive spirit of the technical solution of the present application.

In the following description, certain specific details are set forth for the purpose of illustrating various disclosed embodiments to provide a thorough understanding of various disclosed embodiments. However, those skilled in the related art will recognize that embodiments may be practiced without one or more of these specific details. In other cases, familiar devices, structures, and techniques associated with the present application may not be shown or described in detail so as to avoid unnecessarily confusing the description of the embodiments.

Unless the context requires otherwise, throughout the specification and the claims, the words "including" and variants thereof, such as "comprising" and "having", are to be understood as open-ended and inclusive meaning, i.e., should be interpreted as "including, but not limited to".

References to "one embodiment" or "an embodiment" throughout the specification indicate that a particular feature, structure, or characteristic described in conjunction with an embodiment is included in at least one embodiment. Therefore, the occurrence of "in one embodiment" or "in an embodiment" at various locations throughout the specification need not all refer to the same embodiment. In addition, particular features, structures or characteristics may be combined in any manner in one or more embodiments.

As used in the specification and in the appended claims, the singular forms "a" and "an" include plural referents, unless the context clearly provides otherwise. It should be noted that the term "or" is normally used in its inclusive sense of "or/and", unless the context clearly provides otherwise.

In the following description, in order to clearly show the structure and working method of this application, it will be described with the help of many directional words, but words such as "front", "back", "left", "right", "outside", "inside", "outward", "inward", "up", "down", and the like should be understood as convenient terms and not as limiting terms.

In addition, the terms "horizontal", "vertical", "overhanging" and other terms do not mean that the component is required to be absolutely horizontal or overhanging, but can be slightly tilted. If "horizontal" only refers to its direction being more horizontal compared to "vertical", it does not mean that the structure must be completely horizontal, but can be slightly tilted.

In the description of this application, it should also be noted that unless otherwise specified and limited, the terms "provide", "install", "connect to each other", and "connect" should be broadly understood, for example, it may be fixedly connected, detachably connected, or integrally connected; it may be a mechanical connection or an electrical connection; it may be directly connected, or indirectly connected through an intermediate medium, or it may be an internal connection between two components. For those skilled in this art, they can understand the specific meanings of the above terms in this application based on specific circumstances.

As shown in FIG. 1, a single cylinder internally heated Stirling engine may include a cylinder assembly 1, a first heat exchanger 2, a second heat exchanger 3, a piston 4, and a piston rod 5, etc, wherein cylinder assembly 1 is a closed single cylinder structure. The cylinder assembly 1 may be divided into a hot side cylinder 11 and a cold side cylinder 12. The hot side cylinder 11 and the cold side cylinder 12 are joined together to form a closed single cylinder. It should be understood that the cylinder assembly can also have detachable end covers at one or both ends to facilitate the installation and maintenance of components inside the cylinder. A heat insulation ring 13 may be provided between the hot side cylinder 11 and the cold side cylinder 12 to prevent heat conduction between them.

The first heat exchanger 2, also known as the hot side heat exchanger, is arranged inside the hot side cylinder 11, located at the end of the hot side cylinder 11 of the cylinder assembly 1, and is in fluid communication with an external heat source, and used for heating the working gas in the hot side cylinder 11. The second heat exchanger 3, also known as the cold side heat exchanger, is arranged inside the cold side cylinder 12, located at the end of the cold side cylinder 12 of the cylinder assembly 1, and is in fluid communication with an external cold source, and used for cooling the working gas in the cold side cylinder 12. The first heat exchanger 2 and the second heat exchanger 3 can be made of metal materials with high thermal conductivity. For example, the first heat exchanger 2 and the second heat exchanger 3 may be made of copper material. The first heat exchanger 2 and the second heat exchanger 3 are located outside the stroke of the piston 4.

The piston 4 is a single piston, arranged inside cylinder assembly 1, and may reciprocate linearly within cylinder assembly 1, that is, reciprocate linearly between a hot dead point P1 and a cold dead point P2. Wherein the piston 4 is provided with a gas valve and a gas-flow channel that runs through the piston 4. The gas-flow channel is used to connect the working gas in the hot side cylinder 11 and the cold side cylinder; the gas valve 6 is used to control the on-off of the gas-flow channel, that is, to control the flowing of working gas between the hot side cylinder 11 and the cold side cylinder 12. Specifically, near the end of the temperature rise and expansion of the working gas in the hot side cylinder 11, the gas valve 6 opens, and the high-temperature and high-pressure hot working gas enters the cold side cylinder 12 through the gas-flow channel from the hot side cylinder 11. Then, the gas valve closes, and the piston 4 moves towards the cold side of cylinder assembly 1, further compressing the working gas in the cold side cylinder 12; similarly, the gas valve 6 opens and the working gas enters the hot side cylinder 12 from the cold side cylinder 11 through the gas-flow channel. Subsequently, the gas valve 6 closes and the piston 4 moves towards the hot side, compressing the working gas in the hot side cylinder 11.

One end of piston rod 5 is connected to the piston 4, and the other end is connected to a transmission mechanism 8 located outside cylinder assembly 1, to output the reciprocating motion of the piston 4 through the transmission mechanism 8. Specifically, a through hole 14 is provided at one end (e.g. the cold side) of the cylinder assembly 1, and the piston rod 5 is connected to a transmission rack 82 of the transmission mechanism 8 through the through hole 14. The through hole 14 of the cylinder assembly 1 fits with the piston rod 5 to seal the high-pressure working gas in the cylinder assembly 1. In this embodiment, the transmission mechanism 8 comprises a transmission gear 81 and a transmission rack 82. The transmission rack 82 is fixedly connected to the piston rod 5, and the transmission gear 81 engages with the transmission rack 82. The transmission gear 81 outputs power to user devices such as electrical generators through rotation. When the piston 4 reciprocates linearly, it drives the transmission gear 81 to rotate, achieving power output.

In the single cylinder internally heated Stirling engine of the present application, the first heat exchanger 2 and the second heat exchanger 3 are located inside the cylinder and are not part of the single cylinder. The first heat exchanger 2 and the second heat exchanger 3 serve as heat and cold sources, directly heating and cooling the working gas in the cylinder. The liquid media are in pipelines of the first heat exchanger 2 and the second heat exchanger 3 connecting to the outside of the cylinder assembly 1, so the first heat exchanger 2 and the second heat exchanger 3 can withstand extremely high working gas pressure of the cylinder, the cylinder structure is simple, with higher thermal power and better pressure resistance.

The external heat source includes a heating equipment 21 and a first circulation pump 22. The heating equipment 21, the first circulation pump 22 and the first heat exchanger 2 are sequentially connected by pipeline 23 to form a heat medium circulation. The liquid medium outside the cylinder is heated by the heating equipment 21 and is transported to the first heat exchanger 2 located inside the hot side cylinder 11 through the pipelines by the first circulation pump 22. The first heat exchanger 2 serves as a heat source to directly heat the high-pressure working gas in the hot side cylinder 11, causing the volume of the working gas to expand and pushing the piston 4 to move; after losing heat in the first heat exchanger 2, the liquid medium is transported back to the heating equipment 21 outside the cylinder through pipelines to re-heat. The heating equipment 21 may use solar energy, fuel, etc., to heat the liquid medium.

Similarly, the external cold source includes refrigeration equipment 31 and a second circulation pump 32. The refrigeration equipment 31, the second circulation pump 32, and the second heat exchanger 3 are sequentially connected by pipelines to form a cold medium circulation. The refrigeration equipment 31 cools the liquid cold medium and then the liquid cold medium is transported to the second heat exchanger 3 located inside the cold side cylinder 12 by the second circulation pump 32 through pipelines. The second heat exchanger 3 serves as a cold source to directly cool the working gas in the cold side cylinder 12, causing the volume of the working gas to shrink. When piston 4 reaches the cold dead point P2, the working gas in the cold side cylinder 12 is compressed to high pressure. At this time, the piston 4 reverses and when the working gas pressure in the cold side cylinder 12 drops to the pre-set value, the gas valve 6 opens, opening the gas-flow channel of the piston 4 and the cold high-pressure working gas in the cold side cylinder 11 transfers to the hot side cylinder 11. At the cold side, the cold liquid medium absorbs heat, and is transported back to the refrigeration equipment 31 outside the cylinder through pipelines for heat dissipation and cooling. The structure of refrigeration equipment 31 is well-known and will not be repeated here.

Figure 2:
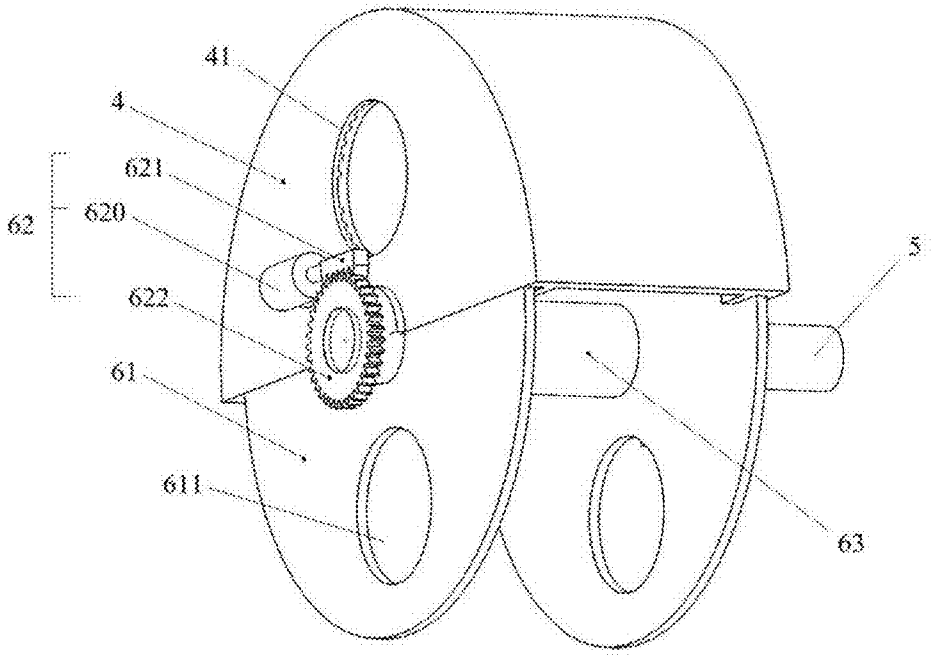
FIG. 2 is a schematic diagram of the piston and the gas valve of a single cylinder internally heated Stirling engine according to an embodiment of the present invention.
Figure 3:
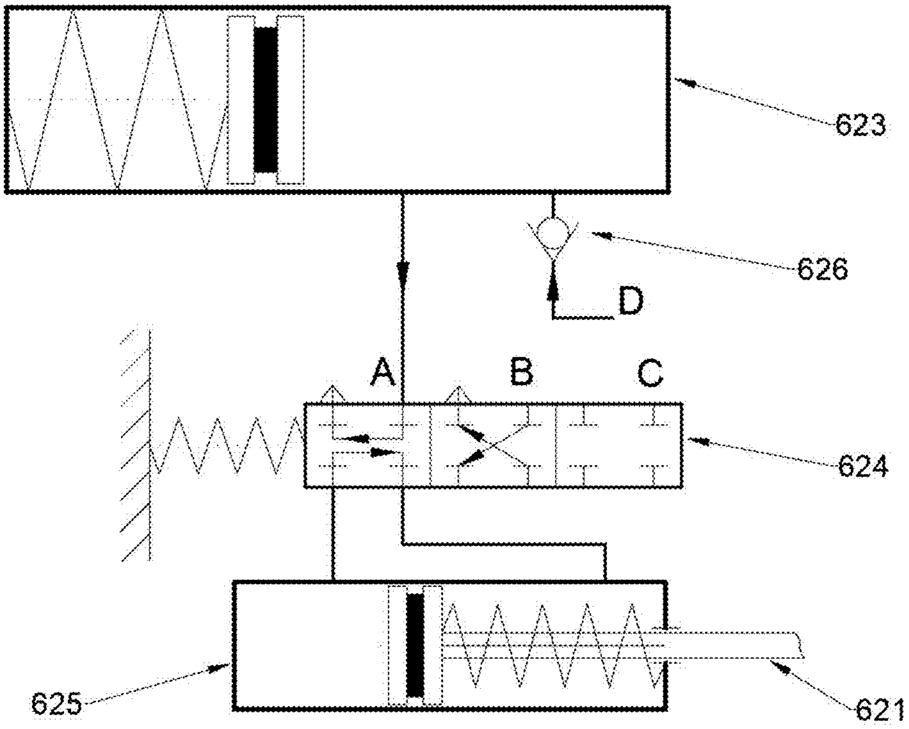
FIG. 3 is a schematic diagram of the working principle of the pneumatic device of the gas valve shown in FIG. 2.

As shown in FIGS. 2 and 3, in this embodiment, the gas valve 6 may include a valve disc 61 and a valve drive mechanism 62. The valve disc 61 is a circular plate that is coaxially mounted inside the piston 4 and can rotate relative to the piston 4. The valve disc 61 is provided with through holes 611 (two shown), and the piston 4 is provided with axial vent holes 41 (two shown), serving as the gas-flow channel between the hot side cylinder 11 and the cold side cylinder 12. It should be understood that the number and layout of axial vent holes 41 are not limited to the illustrated embodiment. The valve drive mechanism 62 is fixedly mounted on the piston 4, used to drive the valve disc 61 to rotate, so as to align or offset the through hole 611 with the axial vent holes 41 of the piston 4, that is, to achieve the opening or closing of the gas valve 6. When the gas valve 6 is opened (i.e., the axial vent holes 41 are aligned with the through holes 611), the working gas can transfer between the hot side cylinder 11 and the cold side cylinder 12; when the gas valve 6 is closed (i.e., the axial vent holes 41 and the through holes 611 are not communicated), the working gas cannot transfer between the hot side cylinder 11 and the cold side cylinder 12.

In this embodiment, as shown in FIG. 3, the valve drive mechanism 62 includes a control rack 621, a control gear 622 and a pneumatic device 620. The control gear 622 and the valve disc 61 are coaxially and fixedly mounted on a shaft sleeve 63, which is rotatably mounted in the piston 4. One end of the control rack 621 is a rack portion, and the other end is a rod portion; the pneumatic device 620 is fixedly connected to the rod portion of the control rack 621, and the rack portion of the control rack 621 engages with the control gear 622. The pneumatic device 620 uses the high-pressure working gas in the cylinder assembly 1 as power to drive the control rack 621 to act, which in turn drives the valve disc 61 to rotate, achieving the opening and closing of the gas-flow channel. Below is a detailed description of the pneumatic device 620. FIG. 3 shows a schematic diagram of the working principle of the pneumatic device 620. The pneumatic device 620 includes a gas reservoir 623, a pressure control valve 624, and an actuator cylinder 625, wherein the gas reservoir 623, the pressure control valve 624, and the actuator cylinder 625 are all existing mature industrial technologies that can be designed and implemented. The gas reservoir 623 is charged with the high-pressure working gas through an intake port D of the one-way intake valve 626 and an interlock between the intake and outlet of the gas reservoir 623 is set, that is, during the gas charging stage of the gas reservoir 623, the outlet of the reservoir is closed. The pressure control valve 624 is a pressure controlled three-position two-way valve. Based on the working gas pressure in the cylinder, the spool of the three-position two-way valve is driven to be in the A/B/C positions corresponding to the outlet of gas reservoir 623 by compressing a spring. When the working gas pressure of the hot side or cold side cylinder is at different levels of preset values, the outlet of the gas reservoir 623 corresponds to the A/B/C positions of the three-position two-way pressure control valve.

Taking the pneumatic device 620 of the hot side cylinder 11 as an example, its working process will be explained. When the piston 4 is located in the middle of the cylinder assembly 1, the pressure inside the hot side cylinder 11 is low, and the spring of pressure control valve 624 expands, pushing the spool of the three-position two-way valve to the right position, that is, the outlet of gas reservoir 623 corresponds to the position A of pressure control valve 624. The spring inside the actuator cylinder 625 pushes the piston inside the actuator cylinder to the left side of the actuator cylinder 625. The piston inside the actuator cylinder 625 is fixedly connected to the control rack 621 of the valve drive mechanism 62, and the control rack 621 is in a retracted state; the gas valve 6 is initially in a closed state. At this time, the control rack 621 of the valve drive mechanism of the cold side cylinder 12 is also in the retracted state, and its three-position two-way valve 624 is also in position A. When the starting motor of the engine drives the piston 4 to move towards the hot side, due to close of the gas valve 6, the working gas in the hot side cylinder 11 is compressed and its pressure rises. The gas pressure inside the gas reservoir 623 is lower than the working gas pressure of the hot side cylinder 11. The high-pressure working gas outside the gas reservoir 623 enters the gas reservoir 623 through the intake port D of the one-way intake valve 626. At this time, the outlet of gas reservoir 623 is controlled to be closed by the interlock. When the piston 4 reaches the hot dead point P1, the working gas pressure of the hot side cylinder 11 reaches its maximum value. As the working gas pressure inside the hot side cylinder 11 increases, the spring of pressure control valve 624 is compressed, and the spool of pressure control valve 624 is eventually pushed to position C by pressure, that is, the outlet of gas reservoir 623 corresponds to the position C of the pressure control valve 624. The gas passages to the actuator cylinder 625 is blocked at this position. When the piston 4 reverses and moves towards the cold side cylinder 12, the working gas pressure inside the hot side cylinder 11 decreases. When the working gas pressure in the hot side cylinder 11 drops to the pre-set value, the gas in the hot side cylinder 11 flows into the cold side cylinder 12. The spool of the pressure control valve 624 is pushed to position B by the spring, that is, the outlet of gas reservoir 623 corresponds to the position B of the pressure control valve 624. At this time, the high-pressure gas in the gas reservoir 623 enters the left chamber of the actuator cylinder 625 through the internal passage of the pressure control valve 624, pushes the piston of the actuator cylinder 625 to move to the right and compresses the spring inside the actuator cylinder 625; At the same time, the gas in the right chamber of cylinder 625 is discharged through the corresponding passage of the pressure control valve 624. The piston of cylinder 625 drives the control gear 621 to move, pushing the control gear 622 to rotate, and thereby opening the gas valve 6. The high-temperature and high-pressure gas in the hot side cylinder 11 can enter the cold side cylinder 12 through the gas valve 6. At this time, the control rack 621 extends. In the cold side cylinder, due to the fixed connection and coaxial rotation of the gas valves at the hot side and the cold side through a shaft sleeve in this embodiment, the control rack 621 of the cold side extends too. Because of the low pressure of the cold side cylinder 12, the spool of the pressure control valve 624 is always in the position C, corresponding to the outlet of the gas reservoir 623, as shown in FIG. 3. The spool of the pressure control valve 624 at the cold side is in the position C, and the chambers on both sides of the actuator cylinder 625 are communicated. The high pressure gas of the gas reservoir 623 is vented through the passage of the pressure control valve 624. When the piston 4 continues to move towards the cold side cylinder 12, the pressure of the working gas in the hot side cylinder 11 further decreases. When it reaches the other pre-set pressure value, the working gas in the hot side cylinder 11 no longer flows into the cold side cylinder 12 in large quantities. The pressure control valve 624 at the hot side senses the decrease of the pressure of the working gas in the hot side cylinder, and its spring further expands, pushing the spool of three-position two-way valve 624 to position C. That is, the high-pressure gas outlet of the gas reservoir 623 corresponds to the position C of the pressure control valve 624. The high-pressure gas in the gas reservoir 623 changes direction and enters the right chamber of the actuator cylinder 625. Together with the compression spring inside the actuator cylinder 625, the piston of the actuator cylinder 625 is pushed to move to the left side of the actuator cylinder 625, thereby driving the connected control rack 621 to move and close the gas valve 6. At this time, the control rack 621 of the hot side is retracted, and the control rack symmetrically installed on the cold side is also retracted. The working process of the pneumatic device 620 of the cold side cylinder 12 is the same as that of the pneumatic device of the hot side cylinder and will not be further explained. It should be understood that the structure of the pneumatic device 620 is not limited to that described in this embodiment.

In one embodiment, a regenerator (not shown) may be installed inside the piston 4 to improve engine's thermal efficiency.

The following describes the working process of the single cylinder internally heated Stirling engine of the present application:

S1: The working gas in the hot side cylinder 11 is heated by the first heat exchanger 2 constantly and its pressure and temperature increases, which pushes the piston 4 to move towards the cold side cylinder 12. During this process, the heating equipment 21 heats the hot liquid medium, and the first circulation pump 22 delivers the hot liquid medium to the first heat exchanger 2, heating the working gas in the hot side cylinder 11. The working gas in the hot side cylinder 11 expands and pushes the piston 4 to move towards the cold side cylinder 12. As the volume of the hot side cylinder 11 increases, the pressure of the working gas in the cylinder decreases. When it reaches the preset pressure value, the valve drive mechanism 62 opens the gas valve 6, thereby opening the gas-flow channel of the piston 4, and the high-temperature and high-pressure working gas in the hot side cylinder 11 flows into the cold side cylinder 12.

S2: After the high-temperature and high-pressure gas in the hot side cylinder 11 flows into the cold side cylinder 12, the working gas pressure in the hot side cylinder 11 further decreases. After reaching the other preset value, the valve drive mechanism 62 closes the gas valve 6, that is, closes the gas-flow channel of the piston 4. The piston 4 continues to move towards the cold side cylinder 12 by the inertial force of motion (or external forces such as flywheels, etc.), compressing the working gas that is mixed with high-temperature working gas in the cold side cylinder 12.

S3: After receiving the high-temperature working gas flowed from the hot side cylinder 11, the high-temperature working gas mixes with the original low-temperature working gas in the cold side cylinder 12. After mixing, the working gas heats up, and its pressure increases. After the piston 4 reaches the cold dead point P2, it reverses and moves towards the hot side cylinder 11.

S4: As the volume of the cold side cylinder 12 increases, the pressure of the working gas in the cylinder decreases. When it reaches the preset pressure value, the valve drive mechanism 62 opens the gas valve 6, opening the gas-flow channel of the piston 4, and the high-pressure working gas in the cold side cylinder 12 flows into the hot side cylinder 11. Meanwhile, the remaining working gas in the cold side cylinder 12 is cooled by the second heat exchanger 3 and shrinks.

S5: After the low-temperature working gas of the cold side cylinder 12 flows into the hot side cylinder 11, the pressure of the working gas in the cold side cylinder 12 further decreases. When it reaches the other preset value, the valve drive mechanism 62 closes the gas valve 6, thereby closing the gas-flow channel of the piston 4. The piston 4 still moves towards the hot side cylinder 11 by inertial force (or other external forces such as flywheel, etc.), compressing the working gas that is mixed with low-temperature working gas in the hot side cylinder 11.

S6: After the piston 4 reaches the hot dead point P1, the low-temperature mixed working gas in the hot side cylinder 11 is heated by the first heat exchanger 2 and expands, pushes the piston 4 to move in the opposite direction and repeating the cycle of S1 to S5.

Preferably, this application can be used in the working scenario of ultra-low temperature cold sources (such as liquid gases):

For the cold side, the refrigeration equipment 31 continuously cools the cold liquid medium (such as liquid propane) using an ultra-low temperature cold source (such as liquid gas). The cool medium enters the second heat exchanger 3 inside the cold side cylinder 12 through the second circulation pump 32 and the pipeline. The working gas inside the cold side cylinder 12 is cooled and shrinks, and its temperature decreases. At this time, the working gas in the hot side cylinder 11 has a large pressure difference with the working gas in the cold side cylinder 11 when the gas valve 6 is closed and the gas-flow channel is closed, which will push the piston 4 to move and do external work. At the hot side, the heating equipment 21 uses hot source such as seawater or high-temperature exhaust gas from the factory to heat the hot liquid medium. The hot liquid medium enters the first heat exchanger 2 inside the hot side cylinder 11 through the first circulation pump 22 and the pipeline. The first heat exchanger 2 constantly heats the working gas in the hot side cylinder 11, and the working gas heats up and expands, pushing the piston 4 to do work externally. When operating, the valve drive mechanism 62 can be used to close or open the gas-flow channel of the piston 4, which can achieve gas expansion and exchange of working gases between the hot and cold sides. According to the aforementioned working process, the working principle of the Stirling engine can be realized.

Due to the excellent heat dissipation ability of the flowing water, applying this design to scenarios with water flow can achieve higher efficiency. The heating equipment 21 at the hot side uses fossil fuels to heat the hot liquid medium. The hot liquid medium enters the first heat exchanger 2 inside the hot side cylinder 11 through the first circulation pump 22 and the pipelines. The first heat exchanger 2 constantly heats the working gas in the hot side cylinder 11. The temperature and pressure of the working gas increases when heated, with the gas valve 6 of the piston 4 closed, it pushes the piston 4 to move and work is done. At the cold side, refrigeration equipment 31 utilizes external flowing water to dissipate heat and cool the refrigerant. The refrigerant, i.e., the cold liquid medium enters the second heat exchanger 3 inside the cold side cylinder 12 through the second circulation pump 32 and the pipelines, constantly cooling the working gas in the cold side cylinder 12. The working gas is cooled and its volume shrinks. Then the cooled working gas enters into the hot side cylinder 11 to re-heat. When operating, the gas valve 6 can be closed or opened by the valve drive mechanism 62, and the working gas transfers between the hot and cold sides. According to the aforementioned working process, the working principle of the Stirling engine can be realized.

The beneficial effects of this plan are analyzed as follows:

The present invention provides a new design of a cylinder where the cold side heat exchanger and the hot side heat exchanger act as a heat source and a cold source respectively, which are placed inside the cylinder to directly heat and cool the working gas in the cylinder. Compared to the α type Stirling engine where the external heat source directly heats the cylinder, due to a higher structural strength, the thermal conductivity is low, affecting the engine's thermal power; compared to the β type Stirling engine where external heat sources heat pipelines directly connected to the cylinder, due to the low strength of high thermal conductivity metal materials such as pipelines at high temperatures, they become a weakness in the strength of the cylinder, limiting the maximum pressure of the gas working medium inside the cylinder. In this design, the hot side heat exchanger and the cold side heat exchanger can withstand extremely high external working gas pressure, and the cylinder structure is simple, the thermal power is higher, and the pressure resistance of the cylinder structure is better.

Due to the fact that both the hot media and the cold media are transported to the inside of the cylinder through pipelines, the engine can be far away from the heat and cold sources, greatly facilitating equipment installation and use, and greatly expanding the application scenarios of this design.

The crankshaft—connecting rod—flywheel mechanism of the traditional Stirling engine is replaced by the single piston—transmission shaft—rack and gear mechanism, effectively simplifying the engine structure, reducing mechanical losses, improving mechanical efficiency, and greatly reducing installation space and equipment weight.

The preferred embodiments of the present invention have been described in detail above, but it should be understood that after reading the above teachings of the present invention, various changes or modifications to the present invention can be made by those skilled in the art. These equivalent forms also fall within the scope defined by the claims appended hereto.

The invention claimed is:

1. A single cylinder internally heated Stirling engine, comprising:

a cylinder assembly, comprising a hot side cylinder and a cold side cylinder, wherein the hot side cylinder and the cold side cylinder are joined together to form a single closed cylinder, and a heat insulation ring is provided between the hot side cylinder and the cold side cylinder;

a first heat exchanger, which is arranged inside the hot side cylinder and is in fluid communication with an external heat source, and used for heating a working gas in the hot side cylinder;

a second heat exchanger, which is arranged inside the cold side cylinder and is in fluid communication with an external cold source, and used for cooling the working gas in the cold side cylinder;

a piston, which is a single piston, the piston is arranged inside the cylinder assembly and is capable of reciprocating linearly inside the cylinder assembly, wherein the piston is provided with a gas-flow channel and a gas valve, the gas-flow channel is used for the working gas to transfer between the hot side cylinder and the cold side cylinder, and the gas valve is used to control the on/off of the gas-flow channel; and a piston rod, one end of which is connected to the piston and the other end is connected to a transmission mechanism located outside the cylinder assembly.

2. The single cylinder internally heated Stirling engine according to claim 1 wherein the gas valve comprises a valve disc and a valve drive mechanism, wherein the valve disc is provided with through holes, and the piston is provided with axial vent holes as the gas-flow channel; the valve disc and the valve drive mechanism are installed on the piston; the valve drive mechanism is used to drive the valve disc to rotate, so that the through holes of the valve disc and the axial vent holes of the piston are aligned or offset, that is, to achieve the opening or closing of the gas valve.

3. The single cylinder internally heated Stirling engine according to claim 2, wherein the valve drive mechanism comprises a control rack, a control gear, and a pneumatic device, the control gear and the valve disc are coaxially and fixedly mounted on a shaft sleeve, which is rotatably mounted on the piston rod; the pneumatic device is mounted on the piston and connected to the control rack; the control rack engages with the control gear to drive the control gear to rotate; the pneumatic device uses the high-pressure working gas in the cylinder assembly as power to drive the control rack to act.

4. The single cylinder internally heated Stirling engine according to claim 3, wherein one end of the control rack is a rack portion, and the other end is a rod portion; the pneumatic device is fixedly connected to the rod portion of the control rack, and the rack portion of the control rack engages with the control gear.

5. The single cylinder internally heated Stirling engine according to claim 4, wherein the pneumatic device comprises a gas reservoir, a pressure control valve and an actuator cylinder, wherein an inlet of the gas reservoir is fluidly communicated with the cylinder through a one-way intake valve, and an outlet of the gas reservoir is fluidly communicated with the actuator cylinder through the pressure control valve, the pressure control valve is a pressure controlled three-position two-way valve, a piston of the actuator cylinder is connected to the rod portion of the control rack.

6. The single cylinder internally heated Stirling engine according to claim 2, wherein the axial vent holes comprises two radially symmetrical circular through holes.

7. The single cylinder internally heated Stirling engine according to claim 1, wherein the external heat source comprises a heating equipment and a first circulation pump; the first heat exchanger, the first circulation pump and the heating equipment are connected through corresponding pipelines to form a hot medium circulation.

8. The single cylinder internally heated Stirling engine according to claim 1, wherein the external cold source comprises a refrigeration equipment and a second circulation pump; the second heat exchanger, the second circulation pump and the refrigeration equipment are connected through corresponding pipelines to form a cold medium circulation.

9. The single cylinder internally heated Stirling engine according to claim 1, wherein one end of the cylinder assembly is provided with a through hole through which the piston rod passes, and the through hole fits with the piston rod to seal the high-pressure working gas in the cylinder assembly.

10. The single cylinder internally heated Stirling engine according to claim 9, wherein the through hole is provided at the end of the cold side cylinder.

11. The single cylinder internally heated Stirling engine according to claim 1, wherein the transmission mechanism comprises a transmission gear and a transmission rack, wherein the transmission rack is fixedly connected to the piston rod, and the transmission gear engages with the transmission rack.

* * * * *